(12) United States Patent
Kim et al.

(10) Patent No.: US 6,804,583 B2
(45) Date of Patent: Oct. 12, 2004

(54) AUTOMATIC LOCATING SYSTEM FOR A VEHICLE CRASH PAD AND A METHOD THEREOF

(75) Inventors: Jae-Sun Kim, Cheonan (KR); Jong-Bum Choi, Ulsan (KR); Byung-Jo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 254 days.

(21) Appl. No.: 10/028,213

(22) Filed: Dec. 21, 2001

(65) Prior Publication Data

US 2002/0087270 A1 Jul. 4, 2002

(30) Foreign Application Priority Data

Dec. 30, 2000 (KR) .......................................... 2000-86950

(51) Int. Cl.[7] ................................................ G05D 1/02
(52) U.S. Cl. ...................... 700/302; 700/245; 700/253; 700/114
(58) Field of Search ................................. 700/302, 303, 700/56, 117, 114, 193, 245, 253, 259; 702/152; 29/430, 709; 382/141

(56) References Cited

U.S. PATENT DOCUMENTS

| | | | |
|---|---|---|---|
| 4,589,184 A | * 5/1986 | Asano et al. | 29/430 |
| 5,168,453 A | * 12/1992 | Nomaru et al. | 700/114 |
| 5,267,143 A | * 11/1993 | Pryor | 700/56 |
| 5,280,436 A | * 1/1994 | Kubota et al. | 700/302 |
| 5,495,420 A | * 2/1996 | Demarest et al. | 700/117 |
| 5,778,517 A | * 7/1998 | Amesbichler et al. | 29/709 |
| 5,983,166 A | * 11/1999 | Matsumoto et al. | 702/152 |
| 6,158,117 A | * 12/2000 | Mimura et al. | 29/833 |
| 6,266,436 B1 | * 7/2001 | Bett et al. | 382/141 |
| 6,625,517 B1 | * 9/2003 | Bogdanov et al. | 700/193 |

* cited by examiner

*Primary Examiner*—Anthony Knight
*Assistant Examiner*—Ronald D Hartman, Jr.
(74) *Attorney, Agent, or Firm*—Morgan Lewis & Bockius LLP (57) ABSTRACT

In order to automatically supply and locate a crash pad assembly in a vehicle by means of a robot in an automobile manufacturing plant, an automatic locating system of a crash pad for a vehicle according to the present invention comprises a synchronous running truck, a robot unit, first, second, third and fourth position detectors, first and second distance detectors, a limit switch, a vehicle-type detector, a vision controller, and a robot controller.

16 Claims, 5 Drawing Sheets

AUTOMATIC LOCATING SYSTEM FOR A VEHICLE CRASH PAD AND A METHOD THEREOF

BACKGROUND OF THE INVENTION

The present invention relates to an automatic locating system for a vehicle crash pad and a method thereof, and more particularly, to an automatic locating system and a method thereof for automatically supplying and locating a crash pad assembly in a corresponding vehicle by means of a robot in an automobile manufacturing plant.

Generally, an automobile assembly line performs various processes from material selection to assembly in an automobile manufacturing plant. Automakers are increasingly introducing automation systems to keep pace with trends in factory automation in such processing, and making efforts to produce more products in a shorter time and to efficiently use equipment.

With this in mind, an automation system for locating a crash pad assembly in a car body in an automobile manufacturing plant is needed, whereby the crash pad may be supplied and located in the car body by means of a conveyor system and special-purpose machinery.

SUMMARY OF THE INVENTION

The present invention provides an automatic locating system for a vehicle crash pad and a method for automatically supplying and locating a crash pad assembly in a corresponding vehicle by means of a robot in an automobile manufacturing plant. Thus, according to a preferred embodiment of the invention, a synchronous running truck is provided for synchronously moving with an overhead hanger that conveys a car body on an assembly line on a workplace floor. A synchronizing clamping means synchronizes the running truck and overhead hanger. A robot unit, arranged at a side of the synchronous running truck, supplies and locates the crash pad in the car body. The crash pad is clamped by means of a robot gripper and supplied from a crash pad feed conveyor running in parallel with the synchronous running truck.

First, second, third and fourth position detectors output position error signals of the crash pad and the car body by detecting the crash pad and a side of the car body. The detectors are preferably, respectively, arranged at top left, bottom left, top right and bottom right portions of the robot gripper. Also, first and second distance detectors output distance error signals of a mounting position of the crash pad by detecting its mounting holes. The distance detectors are, respectively, arranged at right and left lower portions of the robot gripper. A limit switch outputs an advancing signal when the overhead hanger advances to the working position, and a vehicle-type detector outputs a vehicle-type detection signal after detecting a size of the car body. This detector is located at an upper portion of the overhead hanger.

A vision controller outputs the detected vehicle-type signal and each position error signal received from the first, second, third and fourth position detectors. The vision controller is preferably located at a side of the workplace. A robot controller controls the position correction for the robot unit, as well as clamping and unclamping of the crash pad from the gripper, and synchronizing clamping means. The robot controller acts on the basis of the detected vehicle-type signal received from the vision controller, a vehicle-type signal of the crash pad received from a main controller for managing the assembly line, the advancing signal of the overhead hanger received from the limit switch, and the distance error signals of the mounting position of the crash pad received from the first and second distance detectors. The robot controller and vision controller together comprise a work station controller.

A control method for automatically locating a crash pad for a vehicle according to the present invention comprises the following steps:

S10: comparing an inputted vehicle-type signal of the crash pad with a detected vehicle-type signal from a vehicle-type detector by a robot controller;

S20: correcting and then judging a position of a robot unit based on a received position error signal of the crash pad on a crash pad feed conveyor, which is detected by a position detector, from a vision controller;

S30: outputting a clamping signal in order to advance the robot unit and clamp the crash pad by means of a gripper, and outputting a movement signal to move the robot unit to a car body input waiting position for locating the crash pad in a car body, if position correction of the robot unit is completed;

S40: outputting a solenoid valve control signal for operating actuators of a synchronizing clamping means, if the robot controller receives an advancing signal of an overhead hanger from a limit switch;

S50: correcting and then judging a position of the robot unit based on a received position error signal of the robot unit with respect to detecting holes of a car body pillar, which is detected by a position detector, from the vision controller;

S60: advancing the clamped crash pad into the car body with the gripper of the robot unit by the robot controller if position correction of the robot unit is completed, and correcting and then judging the position of the robot unit based on the received position error signal of the robot unit with respect to detecting holes of the car body pillar, which are detected by position detectors, from the vision controller; and S70: locating the crash pad by the robot unit based on a received distance error signal with respect to mounting holes of the crash pad of the car body from distance detectors, and outputting a signal for unclamping the crash pad clamped by the gripper, and releasing synchronous running of a synchronous running truck while repositioning the robot unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
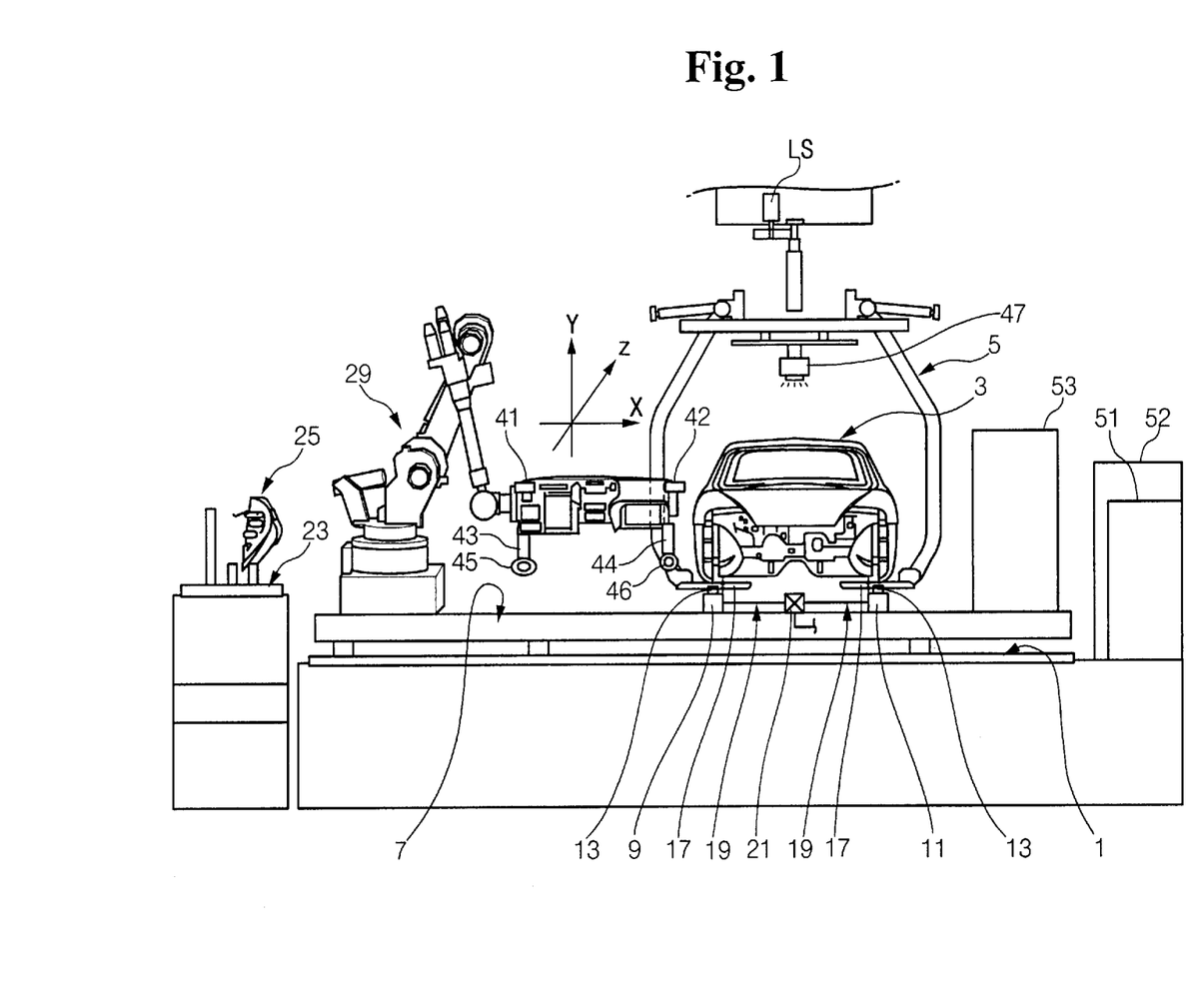
FIG. 1 is a schematic view of an automatic locating system for a vehicle crash pad according to a preferred embodiment of the present invention.

An automatic locating system for a vehicle crash pad according to a preferred embodiment of the present invention includes a synchronous running truck 7 that synchronizes with a car body 3 suspended by an overhead hanger 5, which conveys the car body 3 along an assembly line of a workplace floor 1. Synchronization of truck 7 and hanger 5 is provided by actuators 9 and 11 and synchronizing clamps 13.

First and second actuators 9 and 11 are provided as a single unit at a side of the synchronous running truck 7. Synchronizing clamps 13 synchronize the synchronous running truck 7 with the overhead hanger 5 when they are connected to the attachment frame 17 of the overhead hanger 5. Clamps 13 are actuated by operation of the first actuator 9 and the second actuator 11, each provided with a piston rod. A solenoid valve opens and closes pressure line 19 on the basis of a control signal to supply pressure to the actuators 9 and 11.

A robot unit 29 is arranged on a side of the synchronous running truck 7. The robot unit 29 supplies and locates crash pad 25 in the car body 3. The crash pad 25 is clamped by means of a gripper 27 (FIG. 2) and is supplied from a crash pad feed conveyor 23 running in parallel with the synchronous running truck 7.

Figure 2:
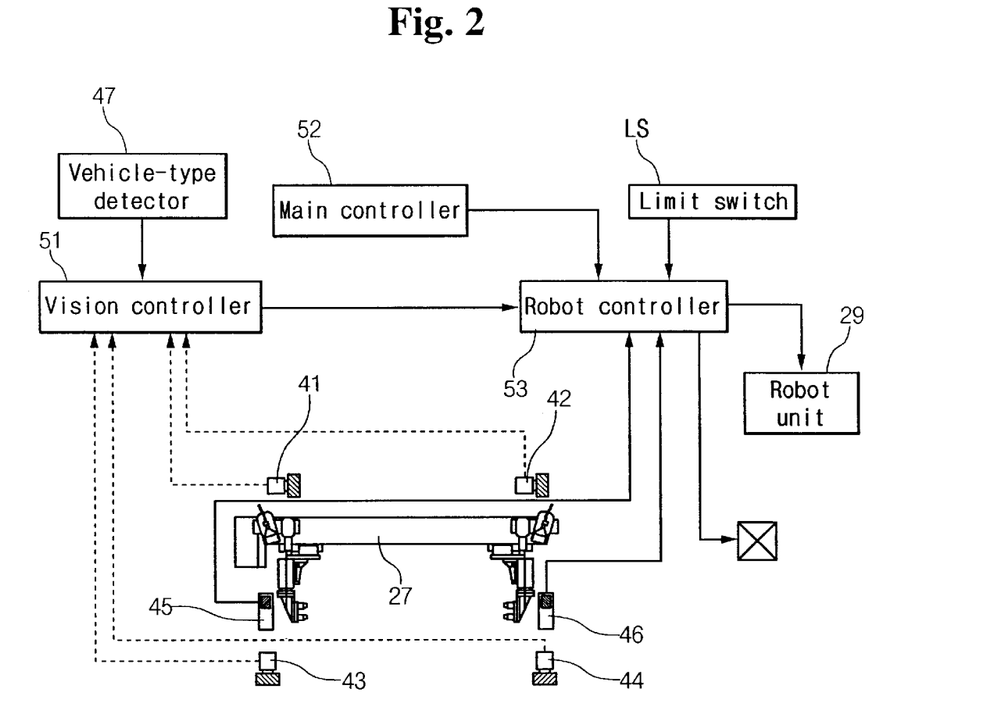
FIG. 2 is a block diagram of an automatic locating system for a vehicle crash pad according to a preferred embodiment of the present invention.
Figure 3:
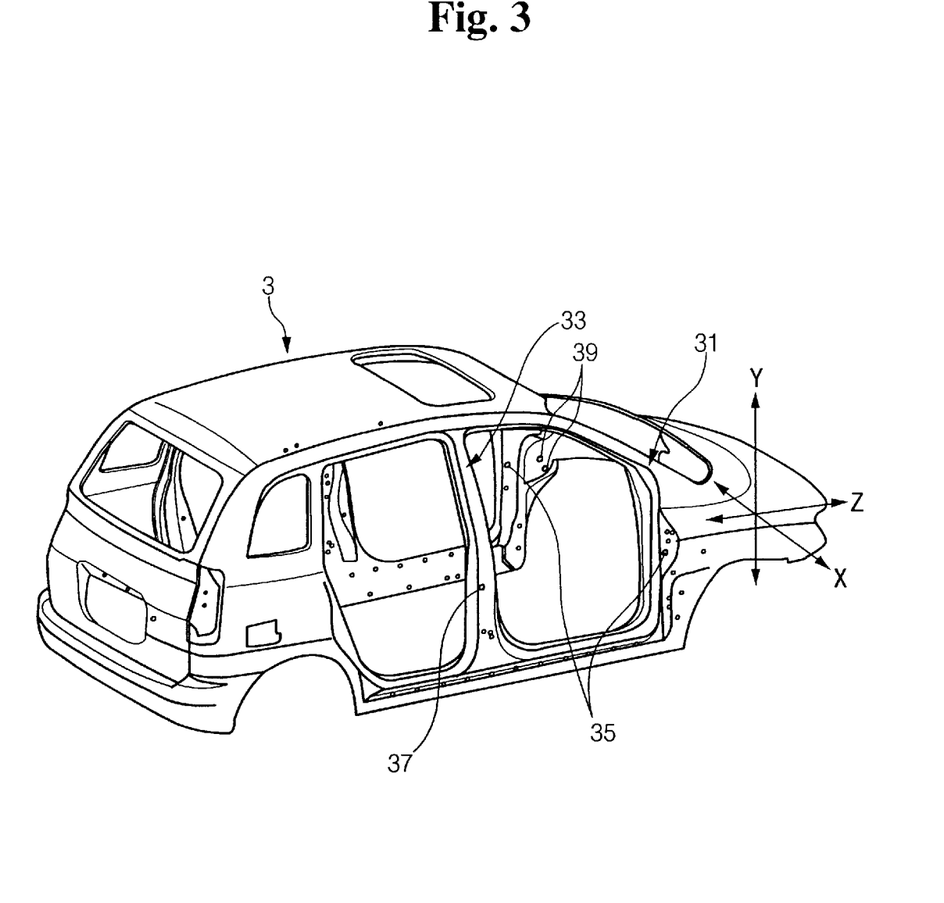
FIG. 3 is a perspective view of a sensing unit for correcting the position of a robot by applying an automatic locating system according to a preferred embodiment of the present invention.

First, second, third and fourth position detectors 41, 42, 43 and 44 output position error signals relative to the crash pad 25 and the car body 3 by detecting the crash pad 25 and detecting holes 35 and 37 (FIG. 3) that are positioned at sides of a pillar A 31 and a pillar B 33 of the car body 3. The position detectors are respectively arranged at top left, bottom left, top right and bottom right portions of the gripper 27 of the robot unit 29. Furthermore, first and second distance detectors 45 and 46 output a distance error signal relative to the mounting position of the crash pad 25 by detecting its mounting holes 39. The distance detectors are respectively arranged at the right and left lower portions of the gripper 27 of the robot unit 29.

A limit switch LS outputs an advancing signal when the overhead hanger 5 advances to a working position. The limit switch is positioned at an advancing side of the overhead hanger 5. A vehicle-type detector 47, which outputs a vehicle-type detection signal by detecting a size of the car body 3, is formed at an upper portion of the overhead hanger 5. A vision controller 51, which outputs the detected vehicle-type signal and each position error signal received from the first, second, third and fourth position detectors 41, 42, 43 and 44, is conveniently located adjacent the workplace to communicate with the various components.

A robot controller 53 is disposed on a side of the synchronous running truck 7. The robot controller 53 controls position correction of the robot unit 29, clamping and unclamping of the crash pad 25, and the synchronizing clamping means. Control is executed on the basis of the detected vehicle-type signal received from the vision controller 51, a vehicle-type signal of the crash pad received from a main controller 52 for managing the assembly line, the advancing signal of the overhead hanger 5 received from the limit switch LS, and the distance error signals of the mounting position of the crash pad 25 received from the first and second distance detectors 45 and 46. The robot controller and vision controller may be considered together as a work station controller. In an alternative embodiment, a single controller may be programmed to accomplish the functions of both.

The first and second distance detectors 45 and 46 may be laser sensors for detecting distance to the mounting position of the crash pad 25 through a reflected time of laser beams, and the vehicle-type detector 47 may be a photo sensor.

While this invention is described in connection with a practical and preferred embodiment, it is to be understood that the invention is not limited to the disclosed embodiments, but, on the contrary, is intended to cover various modifications and equivalent arrangements included within the spirit and scope of the appended claims.

With this construction, a control method for controlling an automatic locating system of a crash pad for a vehicle will be described in detail.

Figure 4A:
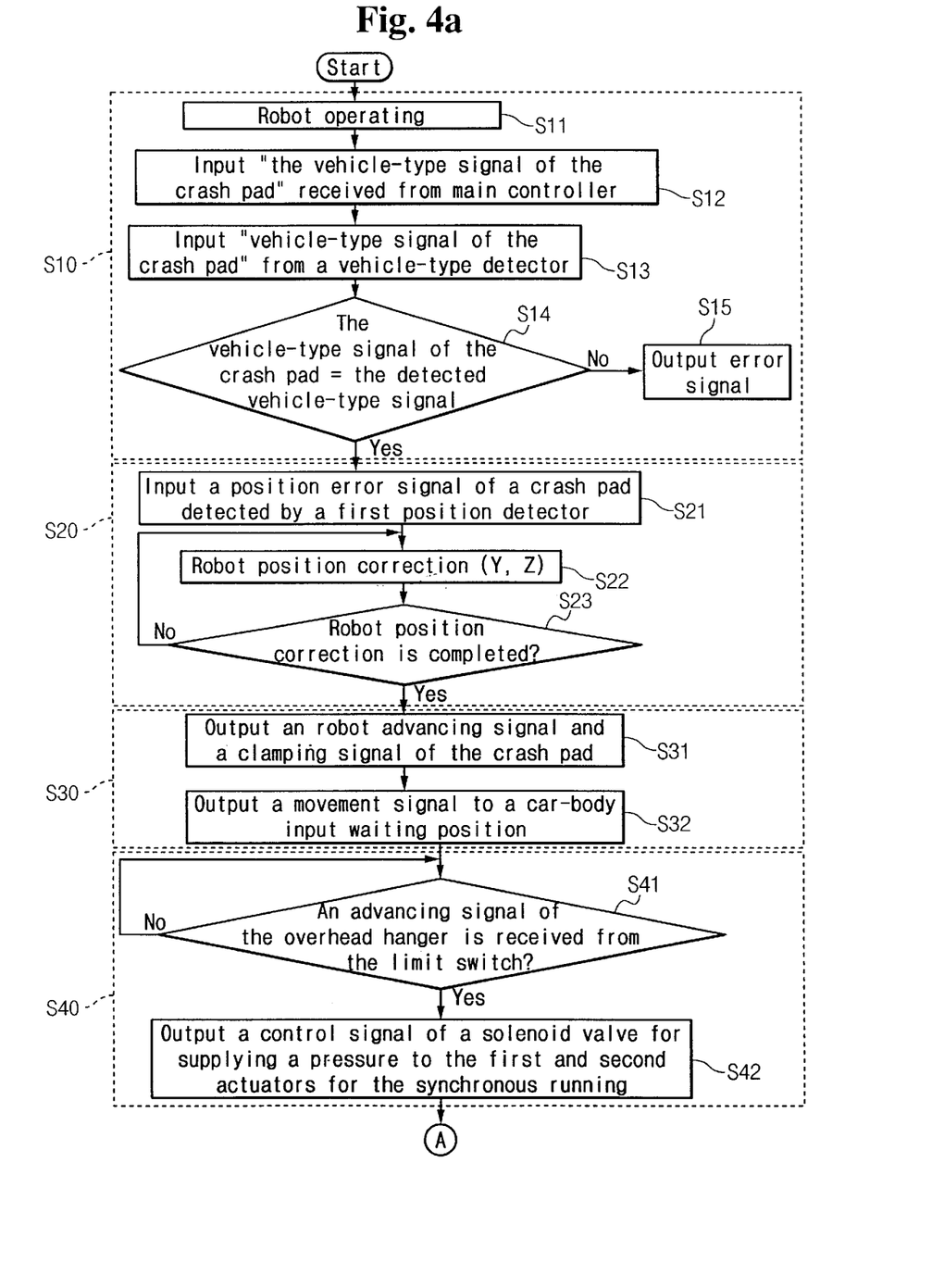
FIGS. 4a and 4b illustrate a flowchart for a control method according to a preferred embodiment of the present invention.

Firstly, the robot controller 53 operates the robot unit 29 at step Si 1, and when it does so, it receives a vehicle-type signal of the crash pad inputted into a corresponding working process through the overhead hanger 5 based on data from the main controller 52 at step S12.

Also, the robot controller 53 receives the detected vehicle-type signal from the vehicle-type detector 47 based on the size of the car body through the vision controller 51 at step S13, wherein it determines whether both vehicle-types are the same by comparing the vehicle-type signal of the crash pad with the detected vehicle-type signal at step S14.

Moreover, if the robot controller 53 determines that both vehicle-types are the same at step S14, it receives a position error signal of the crash pad 25 detected by the first position detector 41 in coordinates Y and Z of the basis coordinates X, Y and Z through the vision controller 51 at step S21, wherein the first position detector 41 is arranged at a side of the gripper 27 of the robot unit 29. However, if the robot controller 53 determines that both vehicle-types are not the same at step S14, it outputs a control signal and stops the overhead hanger 5 and the crash pad feed conveyor 23, and operates an alarm system (not shown).

Next, in step S21, the robot controller 53 corrects a position of the robot unit 29 based on the received crash pad position error signal at step S22. Controller 53 determines whether position correction is completed by comparing a position correction amount of the robot unit 29 with the position error signal of the crash pad, at step S23.

As described above, if the position correction is completed at step S23, the robot controller 53 outputs a clamping signal for advancing the robot unit 29 to a side of the crash pad feed conveyer 23 and clamping the crash pad with the gripper 27 at step S31. Next, the robot controller 53 outputs a movement signal so that the robot unit 29 moves to a car body input waiting position for locating the crash pad 25 in the car body at step S32.

When the robot unit 29 moves the crash pad 25 to the car body waiting position at step S32, the robot controller 53 determines whether an advancing signal of the overhead hanger 5 is received from the limit switch LS at step S41. If the robot controller 53 receives the advancing signal from the limit switch LS at step S41, it outputs a control signal to a solenoid valve 21 for supplying a pressure to the first and second actuators 9 and 11 for the synchronous operation of the synchronizing clamps 13 at step S42.

Moreover, when the synchronizing clamps 13 connect with the attachment frames 17 of the overhead hanger 5 at step S42, such that synchronous running track 7 synchronously runs with the overhead hanger 5, the robot controller 53 receives a position signal of the detecting holes 37 of pillar B 33 of the car body 3. The holes 37 are detected by the second position detector 42, which provides a position error signal in coordinates Y and Z of the basis coordinates X, Y and Z through the vision controller 51 at step S51. The second position detector 42 is arranged at the side of the gripper of the robot unit 29.

The robot controller 53 corrects the position of the robot unit 29 at step S52, based on the received position error signal of the robot unit 29 from step S51. Next, the robot controller 53 determines whether a position correction of the robot unit 29 is completed by comparing the position correction amount with the position error signal of the robot unit 29 at step S53.

Figure 4B:
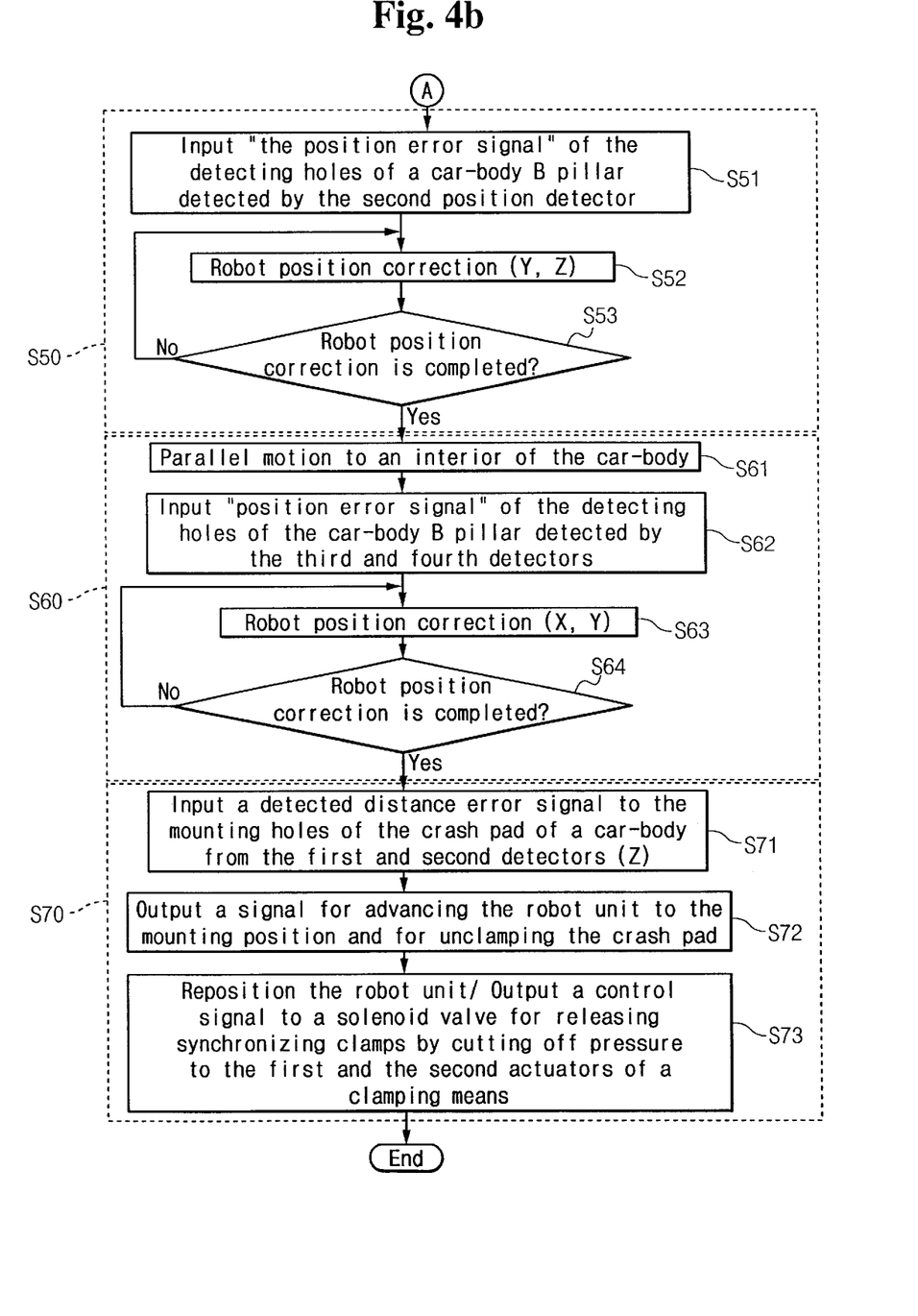

If the position correction of the robot unit 29 is completed at step S53, the robot controller 53 advances the crash pad 25 clamped by the gripper 27 of the robot unit 29 in a parallel motion to an interior of the car body 3 at step S61. Then, the robot controller 53 receives a position signal of the detecting holes 35 of pillar A 31 of the car body 3. Holes 35 are detected by the third and fourth position detectors 43 and 44, which provide a position error signal in coordinates X and Y of the basis coordinates X, Y and Z through the vision controller 51 at step S62. The third and fourth position detectors 43 and 44 are positioned at both sides of the lower portion of the gripper of the robot unit 29.

Next, the robot controller 53 corrects the position of the robot unit 29 at step S63, based on the position error signal of the robot unit 29 received from step S62. Controller 53 also determines whether a position correction of the robot unit 29 is completed by comparing the position correction amount with the position error signal of the robot unit 29 at step S64.

If the position correction of the robot unit 29 is completed at step S64, the robot controller 53 receives a Z coordinate detected distance error signal with respect to the mounting holes 39 of the crash pad of the car body from the first and second detectors 45 and 46 at step S71. Moreover, the robot controller 53 outputs a signal for advancing the robot unit 29 to the mounting position of the crash pad based on the distance error signal. Controller 53 also outputs a signal for unclamping the crash pad 25 clamped by the gripper 27 at step S72.

After repositioning the robot unit 29, the robot controller 53 outputs a control signal to a solenoid valve 21 for releasing the synchronizing clamps 13 and 15 by cutting off the pressure to the first and the second actuators 9 and 11 at step S73.

As described above, the present invention need not add a new special-purpose machine tool even if a new assembly line is added, and it reduces costs because of complete automation by means of the robot unit 29. Moreover, the present invention applies to various vehicle types, and it does not require new special-purpose machinery because of automatic supplying and locating of the crash pad assembly in a do corresponding vehicle by means of a robot in an automobile manufacturing plant. The present invention also results in economic advantages in that can it reduce the number of workers because of the complete automation provided by the robot unit. Moreover, the present invention can exclude operations disliked by workers, and it also results in the improvement of productivity.

What is claimed is:

1. An automatic locating system for a vehicle crash pad, comprising:
    a synchronous running truck for synchronously moving with an overhead hanger that conveys a car body on an assembly line on a workplace floor;
    a robot unit, arranged at a side of the synchronous running truck, for supplying and locating the crash pad in the car body, the crash pad being supplied from a crash pad feed conveyor running in parallel with the synchronous running truck;
    first, second, third and fourth position detectors for outputting position error signals of the crash pad and the car body by detecting the crash pad and detecting holes in pillars of the car body;
    first and second distance detectors for outputting distance error signals for a mounting position of the crash pad by detecting mounting holes for the crash pad in the car body;
    a limit switch for outputting an advancing signal when the overhead hanger advances to a working position;
    a vehicle-type detector for outputting a vehicle-type detection signal after detecting a size of the car body;
    a vision controller for outputting the detected vehicle-type signal and each position error signal received from the first, second, third and fourth position detectors based on the body pillar detecting holes; and
    a robot controller adapted to control positioning of the robot unit, supplying and locating of the crash pad, and synchronizing of the truck and the overhead hanger on the basis of the detected vehicle-type signal received from the vision controller, a vehicle-type signal of the crash pad received from a main controller for managing the assembly line, the advancing signal of the overhead hanger received from the limit switch, and the distance error signals of the mounting position of the crash pad based on the mounting holes received from the first and second distance detectors.

2. The system of claim 1, further comprising:
    first and second actuators mounted on said truck being operated by pressure;
    synchronizing clamps for synchronizing the synchronous running truck with the overhead hanger when connected to an attachment frame of the overhead hanger, said clamps being actuated by the first actuator and the second actuator; and
    a solenoid valve for opening and closing a pressure line supplying the actuators on the basis of a control signal.

3. The system of claim 1, wherein the first and second distance detectors comprise laser sensors for detecting distance to the mounting position of the crash pad through a reflected time of laser beams.

4. The system of claim 1, wherein the vehicle-type detector comprises a photo sensor.

5. A control method for automatically locating a vehicle crash pad, comprising:
    a) comparing an inputted vehicle-type signal of the crash pad with a detected vehicle-type signal;
    b) correcting and then judging a position of a robot unit based on a received position error signal of the crash pad on a crash pad feed conveyor;
    c) outputting a clamping signal in order to advance the robot unit and clamp the crash pad by means of a robot gripper, and outputting a movement signal to move the robot unit to a car body input waiting position for locating the crash pad in a car body, if position correction of the robot unit is completed;
    d) outputting a control signal for synchronizing a running truck and overhead hanger;
    e) correcting and then judging a position of the robot unit based on a received position error signal of the robot unit with respect to detecting holes of a car body pillar;
    f) advancing the crash pad into the car body with the gripper of the robot unit if position correction of the robot unit is completed, and correcting and then judging the position of the robot unit based on the received position error signal of the robot unit with respect to detecting holes of the car body pillar; and g) locating the crash pad by the robot unit based on a received distance error signal with respect to mounting holes of the crash pad of the car body from distance detectors, and outputting a signal for unclamping the crash pad clamped by the gripper, and releasing synchronous running of a synchronous running truck after repositioning the robot unit.

6. The method of claim 5, wherein step a) comprises:

operating the robot unit by a robot controller;

receiving the vehicle-type signal of the crash pad inputted into a corresponding working process through the overhead hanger based on data from a main controller;

receiving the detected vehicle-type signal from a vehicle-type detector based on size of the car body; and judging whether both vehicle-types are the same by comparing the vehicle-type signal of the crash pad with the detected vehicle-type signal.

7. The method of claim 5, wherein step b) comprises:

receiving the position error signal of the crash pad in coordinates Y and Z of basis coordinates X, Y and Z;

correcting the position of the robot unit based on the received crash pad position error signal; and judging whether the position correction is completed by comparing a position correction amount of the robot unit with the position error signal of the crash pad.

8. The method of claim 5, wherein step c) comprises: outputting the clamping signal for advancing the robot unit to a side of the crash pad feed conveyer and clamping the crash pad with the gripper, if the position correction is completed; and outputting the movement signal such that the robot unit moves to the car body input waiting position for locating the crash pad in the car body by the robot controller.

9. The method of claim 5, wherein step d) comprises:

judging whether the control signal for synchronizing the running track and the overhead hanger is received by a robot controller, if the robot unit moves the crash pad to the car body waiting position; and outputting the control signal for synchronization to a solenoid valve for supplying a pressure to actuators for synchronous running and operating of synchronizing clamps by the robot controller, if the advancing signal is received.

10. The method of claim 5, wherein step e) comprises:

receiving a position signal based on the detecting holes of the car body pillar detected by a position detector as a position error signal of the robot unit in coordinates Y and Z of the basis coordinates X, Y and Z;

correcting the position of the robot unit by the robot controller based on the received position error signal of the robot unit; and judging whether the position correction of the robot unit is completed by comparing the position correction amount with the position error signal of the robot unit.

11. The method of claim 5, wherein step f) comprises:

advancing the crash pad clamped by the gripper of the robot unit in a motion parallel to an interior of the car body by a robot controller, if the position correction of the robot unit is completed;

receiving the position signal of the detecting holes of the car body pillar detected by position detectors as the position error signal of the robot unit in coordinates X and Y of the basis coordinates X, Y and Z;

correcting the position of the robot unit by the robot controller on the basis of the position error signal of the robot unit; and judging whether position correction of the robot unit is completed by comparing the position correction amount with the position error signal of the robot unit.

12. The method of claim 5, wherein step g) comprises:

receiving the detected distance error signal with respect to the crash pad mounting holes on the car body from the distance detectors, if the position correction of the robot unit is completed;

outputting a signal for advancing the robot unit to a mounting position of the crash pad based on the distance error signal, and for unclamping the crash pad clamped by the gripper, by a robot controller; and outputting a synchronizing control signal to a solenoid valve for releasing synchronizing clamps by cutting off pressure to actuators of the synchronizing clamps, after repositioning the robot unit.

13. A system for automatically locating a vehicle crash pad in a vehicle on an assembly line, the assembly line including a main controller and an overhead hanger carrying a vehicle body for assembly, the vehicle body including crash pad mounting holes and body pillar holes, the system comprising:

a running truck;

synchronizing clamps with actuators disposed on the running truck for synchronizing the running truck with the overhead hanger;

a crash pad feed conveyor running next to the running truck for carrying a vehicle crash pad;

a robot unit mounted on the running truck and having a gripper to retrieve the crash pad from said feed conveyor and locate the crash pad in the vehicle body on the overhead hanger;

a work station controller controlling the robot unit and receiving signals from the main controller;

a plurality of position detectors for detecting the relative position of the robot gripper to the body pillar holes and outputting position signals to the work station controller;

a plurality of distance detectors for detecting a distance from the robot gripper to the crash pad mounting holes and outputting distance signals to the work station controller;

a vehicle-type detector for determining the vehicle type and outputting type signals to the work station controller; and a limit switch to sense when the vehicle body approaches a work position and outputting approach signals to the work station controller;

wherein the work station controller sends a synchronize signal to the actuators in response to the approach signals from the limit switch, and controls the robot unit in response to the distance signals, a comparison of the type signal with type information from the main controller, the distance signals and position error signals.

14. The system according to claim 13, wherein said work station controller includes a vision controller and a separate robot controller communicating with the vision controller.

15. The system according to claim 14, wherein:
the robot controller controls the robot unit, receives signals from the main controller and the vision controller, and sends the synchronize signal;
the position detectors and the vehicle type detector communicate with the vision controller; and
the distance detectors and the limit switch communicate with the robot controller.

16. A control method for automatically locating a vehicle crash pad within a vehicle body using a robot unit positioned by a robot controller, wherein the body includes crash pad mounting holes and position detecting holes in the body pillars, said method comprising:

comparing an inputted vehicle-type signal for the crash pad with a detected vehicle type signal;

correcting then judging the position of the robot unit based on a received position error signal of the crash pad on a crash pad feed conveyor in a first position correction operation;

outputting a clamping signal in order to advance the robot unit and clamp the crash pad by means of a gripper;

outputting a movement signal to move the robot unit to a car body input waiting position for locating the crash pad in the vehicle body if correcting the position of the robot unit is complete;

outputting a control signal for synchronizing a running track and an overhead hanger;

correcting and then judging the position of the robot unit based on a received position error signal of the robot unit position with respect to the position detecting holes in the body pillars in a second position correction operation;

advancing the crash pad into the car body with the gripper if the position correction of the robot is complete;

repeating the second position correction operation for the robot unit with respect to the position detecting holes;

locating the crash pad with the robot unit based on a received distance error signal with respect to the crash pad mounting holes;

outputting a signal for unclamping the crash pad from the gripper and releasing synchronous running of the running track after repositioning the robot unit.

* * * * *